Figure 1:
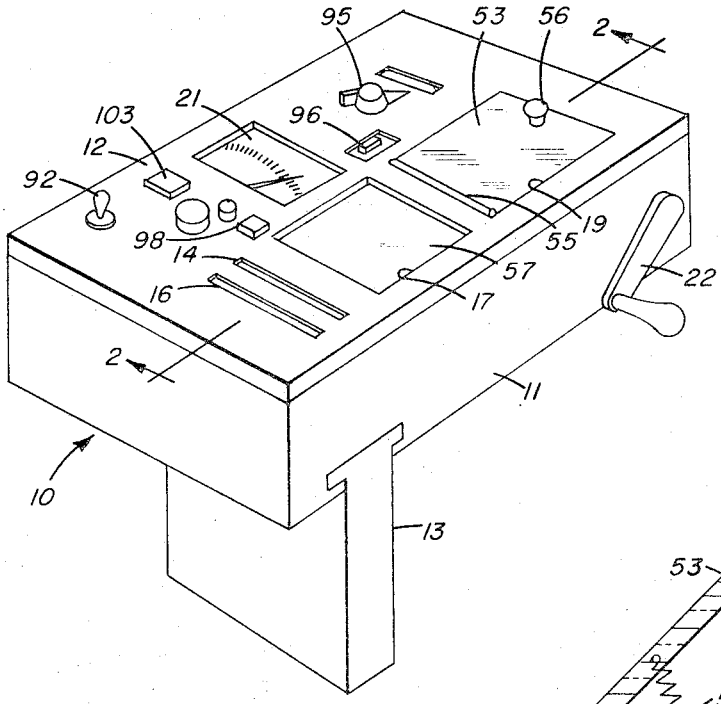
Figure 5:
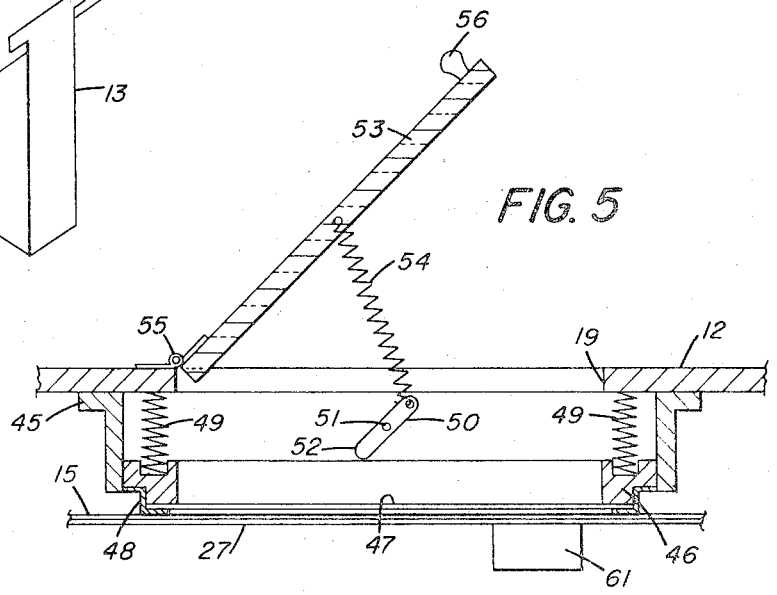
Figure 3:
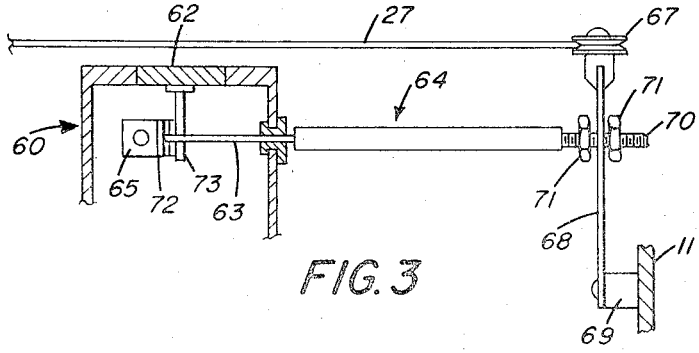
Figure 2:
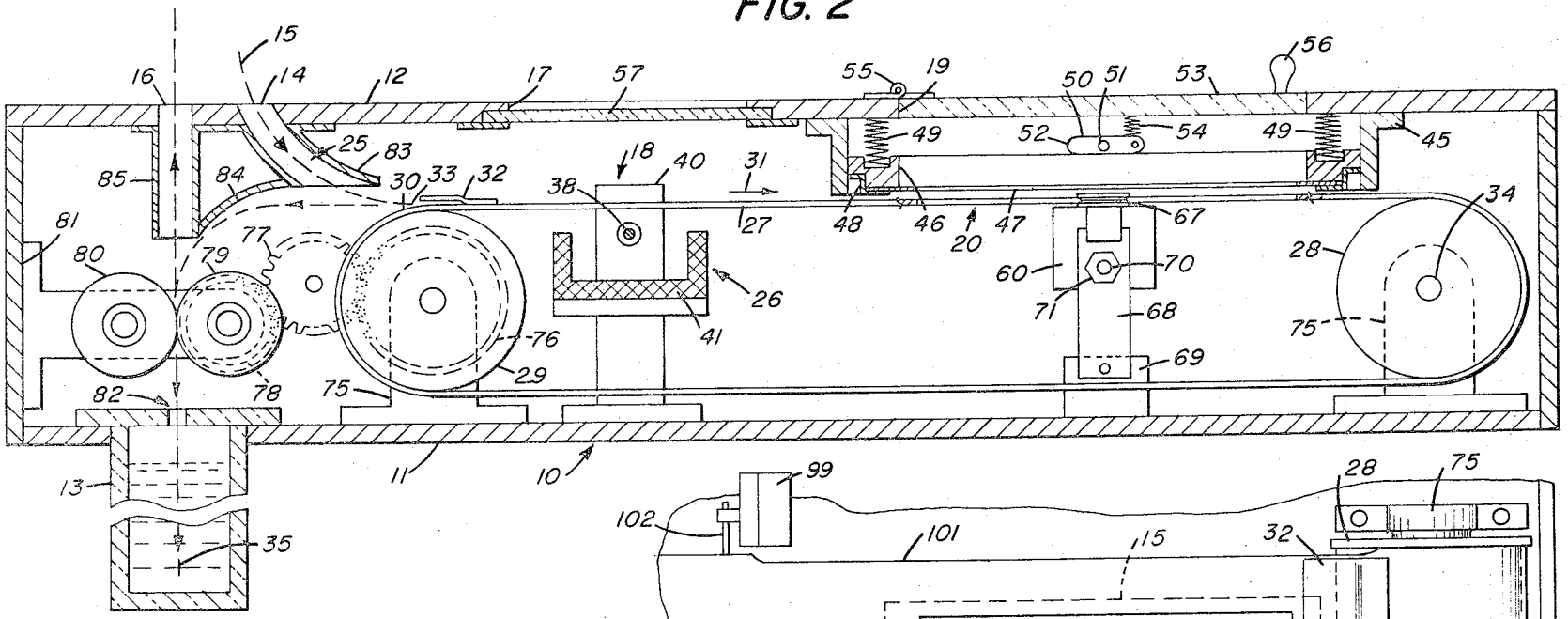
Figure 4:
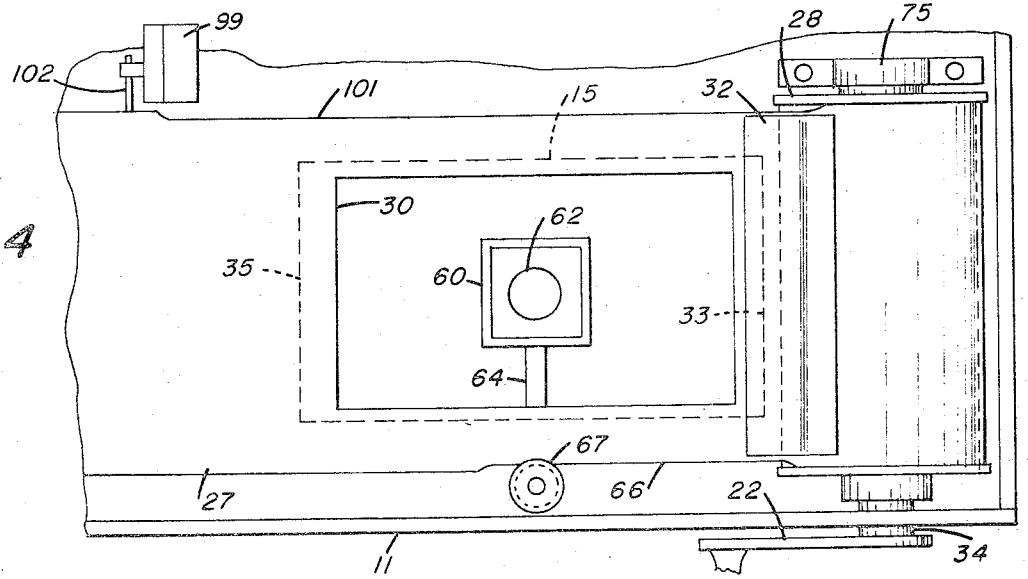
Figure 6:
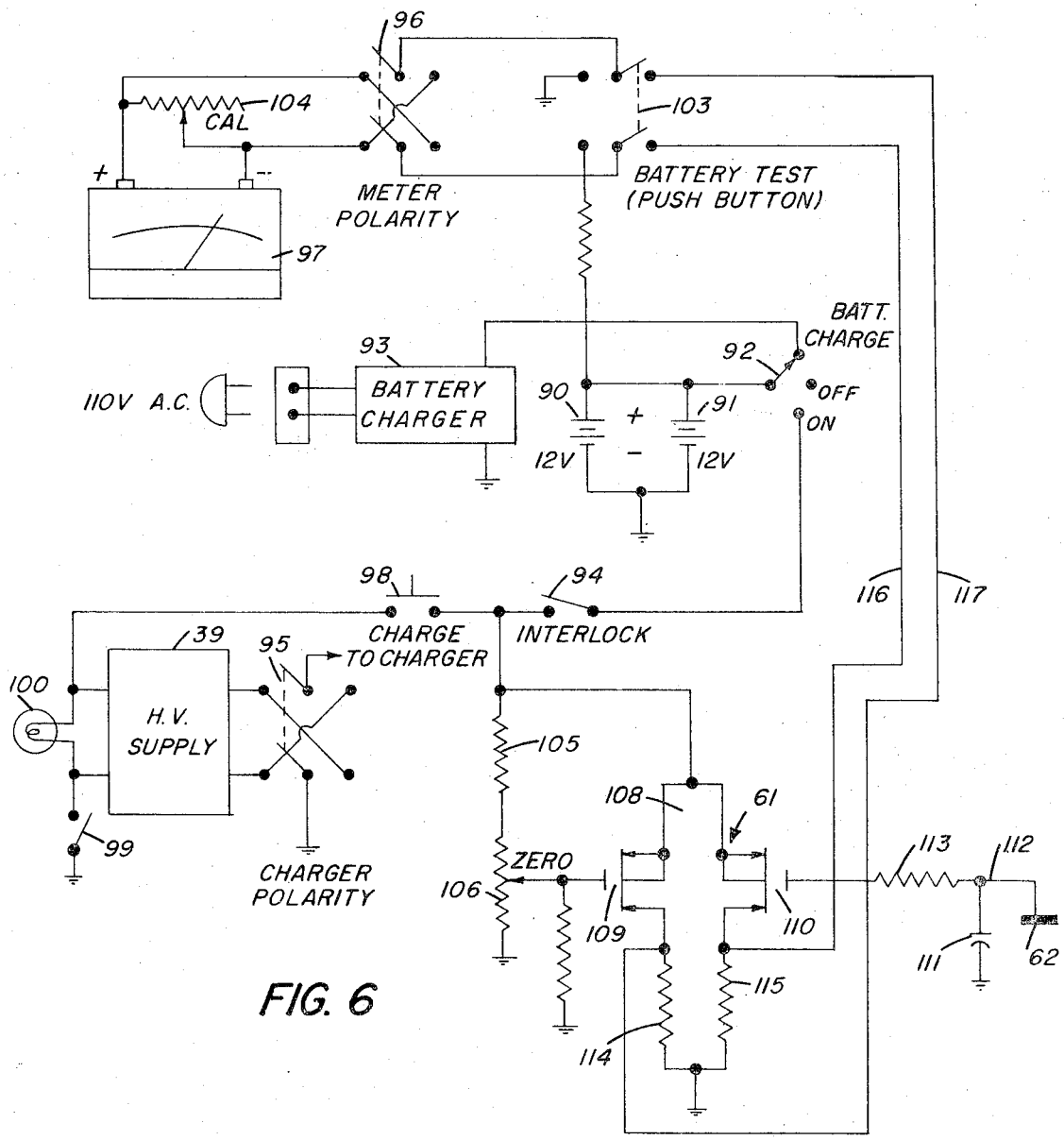

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED FEBRUARY 2, 1971

883 O.G. 9

T883,007
ELECTROPHOTOGRAPHIC APPARATUS

Ivan B. Ville, 2000 Lake Ave, Rochester, N.Y. 14650; James D. Walling, 78 Pinewoods Ave., Troy, N.Y. 12180; and Dale L. Smith, 2000 Lake Ave., Rochester, N.Y. 14650

Filed Feb. 5, 1970, Ser. No. 8,908
Int. Cl. G03g *15/00, 15/22*
U.S. Cl. 355—12
3 Sheets Drawing. 6 Pages Specification

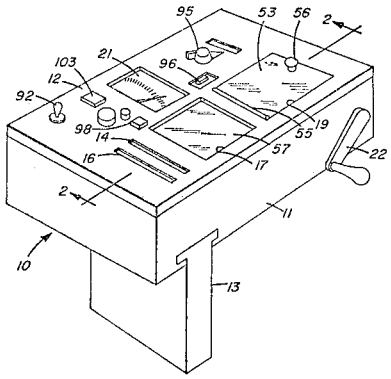

An electrophotographic apparatus in which unit magnification duplication of positive or negative transparent originals can be made on a material comprising a transparent support having a layer of a photoconductive material. The apparatus comprises means for uniformly charging the layer of photoconductive material, imagewise exposing the layer of photoconductive material through the original by means of ambient light, and liquid developing the latent electrostatic image. The charge placed on the photoconductive material is measured by an electrometer which visually displays, on a meter, the measured charge on the photoconductive material. Thus, the sufficiency of the charge as well as the exposure time can be established and controlled. Inasmuch as the apparatus is very compact, it can be readily transported and can also be used for testing as well as demonstrating the electrophotographic properties of different photoconductive materials.

Feb. 2, 1971 I. B. VILLE ET AL T883,007

ELECTROPHOTOGRAPHIC APPARATUS

Filed Feb. 5, 1970 3 Sheets-Sheet 1

IVAN B. VILLE
JAMES D. WALLING
DALE L. SMITH
INVENTORS

BY Lloyd F. Seebach

AGENT

ELECTROPHOTOGRAPHIC APPARATUS

Filed Feb. 5, 1970 3 Sheets-Sheet 2

IVAN B. VILLE
JAMES D. WALLING
DALE L. SMITH
INVENTORS

BY Floyd T. Seebach

AGENT

ELECTROPHOTOGRAPHIC APPARATUS

Filed Feb. 5, 1970 3 Sheets-Sheet 3

IVAN B. VILLE
JAMES D. WALLING
DALE L. SMITH
INVENTORS

BY Lloyd F. Seebach

AGENT